US006957669B2

(12) United States Patent
Suzuki et al.

(10) Patent No.: US 6,957,669 B2
(45) Date of Patent: Oct. 25, 2005

(54) HYDRAULIC ACCUMULATOR

(75) Inventors: Kenichi Suzuki, Nishikamo-gun (JP); Yuichiro Sakakibara, Hekinan (JP); Yutaka Yamashita, Anjyo (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/486,338

(22) PCT Filed: Apr. 18, 2003

(86) PCT No.: PCT/JP03/04940

§ 371 (c)(1),
(2), (4) Date: Feb. 10, 2004

(87) PCT Pub. No.: WO03/089794

PCT Pub. Date: Oct. 30, 2003

(65) Prior Publication Data

US 2004/0231738 A1 Nov. 25, 2004

(30) Foreign Application Priority Data

Apr. 19, 2002 (JP) ............................ 2002-117883

(51) Int. Cl.$^{7}$ ................................................ F16L 55/04

(52) U.S. Cl. ........................... 138/30; 138/31; 138/26; 303/87; 220/721

(58) Field of Search ............................. 138/30, 31, 26; 123/467, 447; 303/87, 113.2–113.4; 220/721, 220/723, 720

(56) References Cited

U.S. PATENT DOCUMENTS 3,695,297 A * 10/1972 Ferrentino ................... 138/30
3,853,147 A * 12/1974 Cibulka ....................... 138/30
3,868,972 A 3/1975 Zirps ........................... 138/30
4,408,635 A * 10/1983 Packer ........................ 138/30
4,615,320 A * 10/1986 Fehrenbach et al. ........ 123/467
4,807,945 A 2/1989 Budecker et al. ........ 303/114.1

FOREIGN PATENT DOCUMENTS

| | | | |
|---|---|---|---|
| DE | 1232418 | 1/1967 | |
| DE | 2 254 032 | 11/1972 | |
| DE | 36 27 264 | 2/1988 | |
| DE | 199 54 326 | 5/2001 | |
| JP | 49-78218 | 7/1974 | |
| JP | 63-46959 | 2/1988 | |
| JP | 2576998 | 2/1988 | |
| JP | 63-195101 | 12/1988 | |
| JP | 3-9194 | * 1/1991 | .................. 138/30 |
| JP | 2589047 | 10/1994 | |
| JP | 2001-336502 | 12/2001 | |
| JP | 2002-155901 | 5/2002 | |

* cited by examiner

*Primary Examiner*—Patrick Brinson
(74) *Attorney, Agent, or Firm*—Buchanan Ingersoll PC

(57) ABSTRACT

A hydraulic accumulator A to be removably attached to a support member includes a liquid chamber R2*b* having a predetermined volume even when no pressurized operating liquid is accumulated, and communicating with a liquid inflow port Pi and a liquid outflow port Po, which are disposed below the liquid chamber R2*b*. A liquid-chamber-R2*b*-side end of an outflow passageway So connecting the liquid chamber R2*b* and the liquid outflow port Po opens to an upper portion of the liquid chamber R2*b*. Further, an inflow passageway Si connecting the liquid chamber R2*b* and the liquid inflow port Pi is coaxially disposed within the outflow passageway So, and a liquid-chamber-R2*b*-side end of the inflow passageway Si opens to the upper portion of the liquid chamber R2*b*.

8 Claims, 4 Drawing Sheets

HYDRAULIC ACCUMULATOR

TECHNICAL FIELD

The present invention relates to a hydraulic accumulator capable of pressurizedly accumulating an operating liquid (i.e., capable of accumulating a pressurized operating liquid) in a liquid chamber formed within the accumulator.

BACKGROUND ART

Hydraulic accumulators of the described type are disclosed in, for example, Japanese Patent No. 2576998, Japanese Utility Model Registration No. 2589047, Japanese Patent Application Laid-Open (kokai) No. 2002-155901, and Japanese Patent Application Laid-Open (kokai) No. 2001-336502. Such a conventional hydraulic accumulator has a liquid chamber which communicates with a liquid inflow port and a liquid outflow port and which has a predetermined volume even when no pressurized operating liquid is accumulated, and the liquid outflow port is disposed below the liquid chamber. Therefore, when the hydraulic accumulator is attached to a support member, air remains within the liquid chamber. Notably, the reason why the liquid chamber has a predetermined volume even when no pressurized operating liquid is accumulated is to improve the pulsation absorption characteristic at the beginning of pressurized accumulation of the operating liquid.

However, in the above-identified conventional hydraulic accumulators, both a liquid-chamber-side end of an inflow passageway, which connects the liquid chamber and the liquid inflow port, and a liquid-chamber-side end of an outflow passageway, which connects the liquid chamber and the liquid outflow port, are open to a lower portion of the liquid chamber. Therefore, air cannot be removed efficiently by air bleeding operation (operation of progressively supplying an operating liquid to the liquid inflow port of the hydraulic accumulator) which is carried out when the hydraulic accumulator is attached to a support member. Specifically, during the air bleeding operation, the operating liquid flows from the liquid inflow port to the liquid ouflow port via the liquid chamber. However, since the operating liquid flows only through a bottom portion of the liquid chamber, there is a fear that a large amount of air remains within the liquid chamber, and the air bleeding operation cannot be performed properly.

DISCLOSURE OF THE INVENTION

An object of the present invention is to provide a hydraulic accumulator which allows air bleeding to take place efficiently when the hydraulic accumulator is attached to a support member.

To achieve the above object, the present invention provides a hydraulic accumulator including a liquid chamber which is formed in the hydraulic accumulator and has a predetermined volume even when no pressurized operating liquid is accumulated, the liquid chamber communicating with a liquid inflow port and a liquid outflow port, and the liquid outflow port being disposed below the liquid chamber, characterized in that a liquid-chamber-side end of an outflow passageway connecting the liquid chamber and the liquid outflow port opens to an upper portion of the liquid chamber.

In this hydraulic accumulator, the liquid-chamber-side end of the outflow passageway connecting the liquid chamber and the liquid outflow port is open to the upper portion of the liquid chamber. Therefore, during an air bleeding operation (the progressive supply of an operating liquid to the liquid inflow port of the hydraulic accumulator) to be carried out when the hydraulic accumulator is attached to the support member, the operating liquid flowing into the liquid chamber from the liquid inflow port via the inflow passageway is progressively accumulated in the liquid chamber until the liquid level reaches the liquid-chamber-side end of the outflow passageway. Meanwhile, air within the liquid chamber is forced out toward the liquid outflow port via the outflow passageway. Further, air remaining in the upper portion within the liquid chamber is mixed in the form of bubbles into the operating liquid flowing into the liquid chamber via the inflow passageway, and these bubbles, together with the operating liquid, flow out toward the liquid outflow port. Therefore, by the air bleeding operation in which an operating liquid is progressively supplied to the liquid inflow port of the hydraulic accumulator, air within the liquid chamber can be discharged to the outside of the liquid chamber, thus achieving intended excellent air removal.

In this case, the outflow passageway is preferably formed of a tubular member, so that the hydraulic accumulator can be configured simply and at low cost.

Further, preferably, an inflow passageway connecting the liquid chamber and the liquid inflow port is coaxially disposed within the outflow passageway; and a liquid-chamber-side end of the inflow passageway opens to the upper portion of the liquid chamber. In this case, even when the flow direction of the liquid inflow port and the inflow passageway and the flow direction of the liquid outflow port and the outflow passageway are reversed, the air bleeding operation can be performed in the same manner, and intended excellent air removal can be realized.

Moreover, to achieve the above object, the present invention provides a hydraulic accumulator including a liquid chamber which is formed in the hydraulic accumulator and has a predetermined volume even when no pressurized operating liquid is accumulated, the liquid chamber communicating with a liquid inflow port and a liquid outflow port, and the liquid outflow port being disposed below the liquid chamber, characterized in that a liquid-chamber-side open end of an outflow passageway connecting the liquid chamber and the liquid outflow port is located above a liquid-chamber-side open end of an inflow passageway connecting the liquid chamber and the liquid inflow port.

This hydraulic accumulator provides operation and effects (intended excellent air removal) similar to those provided by the above-described hydraulic accumulator.

Moreover, to achieve the above object, the present invention provides a hydraulic accumulator including a liquid chamber which is formed in the hydraulic accumulator and has a predetermined volume even when no pressurized operating liquid is accumulated, the liquid chamber communicating with a liquid inflow port and a liquid outflow port, and the liquid outflow port being disposed below the liquid chamber, wherein a lower end portion of the hydraulic accumulator is removably attached to a support member having a supply port to be connected to the liquid inflow port and a discharge port to be connected to the liquid outflow port, characterized in that a liquid-chamber-side end of an outflow passageway connecting the liquid chamber and the liquid outflow port opens to an upper portion of the liquid chamber. This hydraulic accumulator provides operation and effects (intended excellent air removal) similar to those provided by the above-described hydraulic accumulator.

In this case, preferably, the outflow passageway is formed by an outflow pipe having a radially outwardly extending annular flange portion at a lower end, the outflow pipe being vertically movably fitted into a sleeve removably assembled to the support member via an outer circumference of a lower end portion thereof; and the annular flange portion of the outflow pipe is biased upward by means of an elastic member such that the annular flange portion is brought into contact with and fixed to an lower end of the sleeve. In this case, the outflow passageway can be formed by a simple, inexpensive outflow pipe, and thus cost of the hydraulic accumulator can be reduced. Moreover, the outflow pipe is fitted into the sleeve in a vertically movable condition, and the outflow pipe is brought into contact with and fixed to the lower end of the sleeve by means of the biasing force of the elastic member. Therefore, as compared with a case in which the outflow pipe is fixedly press-fitted into the sleeve, generation of foreign matter because of scratching or the like can be prevented, whereby entry of foreign matter into a hydraulic circuit containing the hydraulic accumulator can be prevented.

Further, in this case, work for inspecting the hydraulic accumulator; i.e., charging into the inner liquid chamber a liquid different from the operating liquid, and checking the charge pressure, the liquid accumulation quantity, etc., to be performed before assembly of the hydraulic accumulator to the support member can be performed with the outflow pipe removed. Therefore, liquid charged for the purpose of inspection can be reliably drained and removed after completion of the inspection.

Moreover, in these cases, preferably, an inflow pipe is coaxially disposed within the outflow passageway so as to establish communication between the liquid chamber and the liquid inflow port, the inflow pipe having a radially outwardly extending annular flange portion at a lower end; an upper end portion of the inflow pipe opens to the upper portion of the liquid chamber; and the annular flange portion of the inflow pipe is biased downward by means of an elastic member such that the annular flange portion is brought into contact with and fixed to a reception portion of the support member.

In this case, when the inflow pipe and the support member are of low machining accuracy, during assembly of the hydraulic accumulator to the support member, the inflow pipe coaxially moves within the outflow passageway so as to absorb dimensional errors, to thereby enable reliable assembly of the inflow pipe.

BEST MODE FOR CARRYING OUT THE INVENTION

Figure 1:
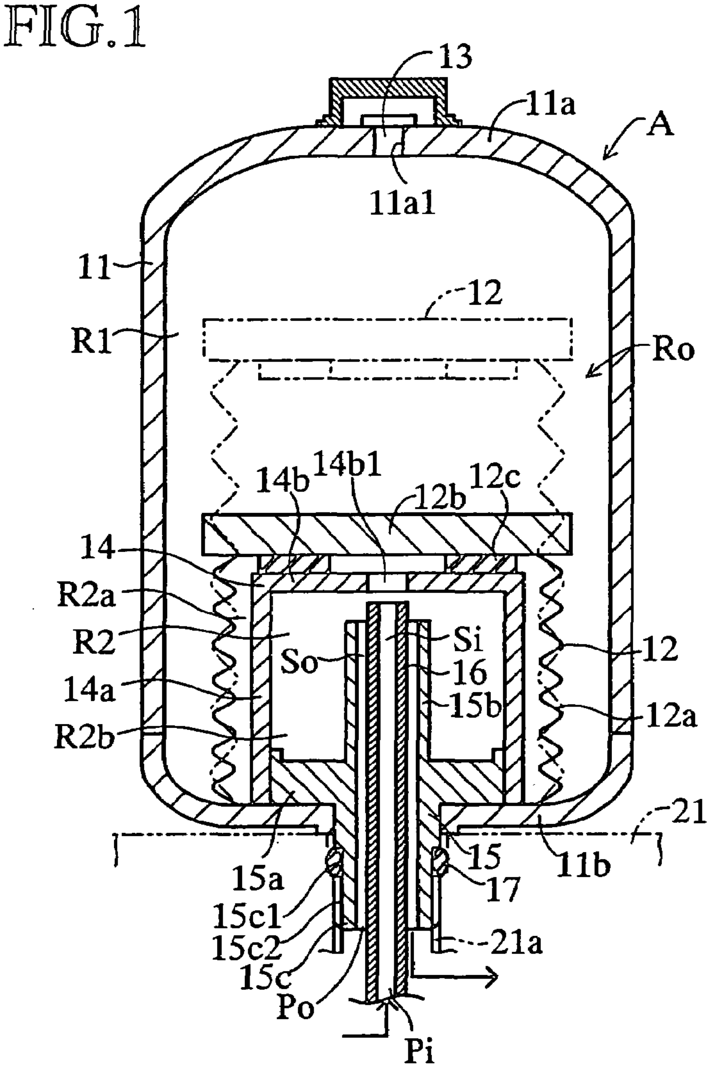
FIG. 1 is a cross-sectional view showing a first embodiment of a hydraulic accumulator according to the present invention.

Embodiments of the present invention will now be described with the drawings. FIG. 1 show a first embodiment of a hydraulic accumulator according to the present invention. The hydraulic accumulator A is a metallic bellows-type accumulator including a shell 11 defining a pressure space Ro, and a bellows unit 12 disposed within the pressure space Ro. The shell 11 is constituted by upper and lower shell halves, which are joined together in a liquid-tight state. A plug 13 is fitted in an airtight manner in a gas-filling port **11*a*1 formed in an upper end wall 11*a* of the shell 11**.

The bellows unit 12 is constituted by a cylindrical, tubular metallic bellows **12*a* and a metallic movable plate 12*b* which is connected in an airtight and liquid-tight state to an upper end of the bellows 12*a*. A lower end of the bellows 12*a* is fixed in an airtight and liquid-tight state to a lower end wall 11*b* of the shell 11. Thus, the pressure space Ro is sectioned into an outer chamber serving as a gas chamber R1 in which predetermined pressurized gas is enclosed, and an inner liquid chamber serving as a liquid chamber R2 communicating with a liquid inflow port Pi and a liquid outflow port Po which are disposed below the shell 11. The liquid inflow port Pi and the liquid outflow port Po are provided below the liquid chamber R2. Located inside the bellows unit 12; namely, inside the liquid chamber R2, are a stay 14, a tubular member 15, and a pipe 16**.

The stay 14 serves to section the liquid chamber R2 within the bellows unit 12 into an outer liquid chamber **R2*a* and an inner liquid chamber R2*b*, and to limit collapsing movement of the bellows unit 12. The stay 14 has a cylindrical, tubular wall portion 14*a* and an upper bottom wall portion 14*b*. A lower end of the cylindrical, tubular wall portion 14*a* is fixed in a liquid-tight state to the lower end wall 11*b* of the shell 11. The upper bottom wall portion 14*b* is formed integrally with an upper end of the cylindrical, tubular wall portion 14*a*. Further, a communication passage hole 14*b*1 connecting the outer liquid chamber R2*a* and the inner liquid chamber R2*b* is formed in the upper bottom wall portion 14*b* of the stay 14**.

An annular flange portion **15*a* of the tubular member 15 is fixed in a liquid-tight state to the lower end wall 11*b* of the shell 11 and the cylindrical, tubular wall portion 14*a* of the stay 14. The tubular member 15 has an upper tubular portion 15*b* projecting toward an upper portion of the inner liquid chamber R2*b*, and a lower tubular portion 15*c* extending downward through the lower end wall 11*b* of the shell 11. Further, an outflow passageway So is formed in a center of the tubular member 15. A lower end of the outflow passageway So communicates with the liquid outflow port Po, and an inner-liquid-chamber-R2*b*-side end (upper end) of the outflow passageway So is open to an upper portion of the inner liquid chamber R2*b***.

Further, an O-ring attachment groove **15*c*1 and an attachment male thread 15*c*2 are formed on the lower tubular portion 15*c* of the tubular member 15, and an O-ring 17 is fitted into the O-ring attachment groove 15*c*1. With the O-ring 17 fitted into the O-ring attachment groove 15*c*1, the male thread 15*c*2 is threadedly inserted into a female thread 21*a* of a pump body 21, which serves as a support member, whereby the hydraulic accumulator A is removably attached to the pump body 21**.

The pipe 16 is coaxially disposed within the outflow passageway So of the tubular member 15 and extends through the tubular member 15. A lower end portion of the pipe 16 is fixedly connected to an inflow path (not shown)

of the pump body 21. Further, an inflow passageway Si is formed in the center of the pipe 16. A lower end portion of the inflow passageway Si communicates with the liquid inflow port Pi, and the inner-liquid-chamber-R2*b*-side end of the inflow passageway Si is open to an upper portion of the inner liquid chamber R2*b*.

Further, in the present embodiment, an annular sealing member 12*c* is carried by a lower surface of the movable plate 12*b* of the bellows unit 12, which surface faces the upper bottom wall portion 14*b* of the stay 14. When the movable plate 12*b* is moved toward and away from the stay 14, the annular sealing member 12*c* comes into and out of liquid-tight contact with the upper bottom wall portion 14*b* of the stay 14, whereby the communication passage hole 14*b*1 in the upper bottom wall portion 14*b* of the stay 14 is separated from and brought into communication with the outer liquid chamber R2*a* and vice versa.

In the thus-configured hydraulic accumulator A of the present embodiment used so as to communicate with a hydraulic circuit (e.g., hydraulic brake piping for a vehicle), when the bellows unit 12 changes its posture from a solid-line posture to an imaginary-line posture in FIG. 1, pressurized liquid from the hydraulic circuit (a discharge portion of the pump) is accumulated in the outer liquid chamber R2*a*. When the bellows unit 12 changes its posture from the imaginary-line posture to the solid-line posture in FIG. 1, pressurized liquid is returned from the outer liquid chamber R2*a* to the hydraulic circuit.

In the hydraulic accumulator A of the present embodiment, the inner-liquid-chamber-R2*b*-side end of the outflow passage So connecting the inner liquid chamber R2*b* and the liquid outflow port Po is open to the upper portion of the inner liquid chamber R2*b*. In this arrangement, during the air bleeding operation (the progressive supply of an operating liquid to the liquid inflow port Pi of the hydraulic accumulator A) to be carried out when the hydraulic accumulator A is attached to the pump body 21 serving as the support member, an operating liquid flowing into the inner liquid chamber R2*b* from the liquid inflow port Pi via the inflow passageway Si is progressively accumulated in the inner liquid chamber R2*b* until the liquid level reaches the inner-liquid-chamber-R2*b*-side end of the outflow passageway So. Meanwhile, air within the inner liquid chamber R2*b* is forced out toward the liquid outflow port Po via the outflow passageway So.

Further, air remaining in the upper portion within the inner liquid chamber R2*b* (including air remaining within the communication passage hole 14*b*1 of the stay 14 and inside the annular sealing member 12*c*) is mixed in the form of bubbles into the operating liquid, which flows into the inner liquid chamber R2*b* via the inflow passageway Si, and these bubbles, together with the operating liquid, flow out toward the liquid outflow port Po. Therefore, by the air bleeding operation in which an operating liquid is progressively supplied to the liquid inflow port Pi of the hydraulic accumulator A, air within the liquid chamber R2 including the inner liquid chamber R2*b* can be discharged from the liquid chamber R2, thus achieving intended excellent air removal.

Further, in the present embodiment, because the outflow passageway So assumes the form of a tube (tubular member) 15, the hydraulic accumulator A can be configured simply and at low cost. Still further, the inflow passageway Si connecting the inner liquid chamber R2*b* and the liquid inflow port Pi is coaxially disposed within the outflow passageway So, and the inner-liquid-chamber-R2*b*-side end of the inflow passageway Si is open to the upper portion of the inner liquid chamber R2*b*. Therefore, even when the flow direction of the liquid inflow port Pi and the inflow passageway Si and the flow direction of the liquid outflow port Po and the outflow passageway So are reversed, the same operation as in the above-described embodiment can be achieved, and intended excellent air removal can be realized. Furthermore, because the inner-liquid-chamber-R2*b*-side end of the inflow passageway Si is open to the upper portion of the inner liquid chamber R2*b*, pressurized liquid (pulsating operating liquid) from the hydraulic circuit (the discharge portion of the pump) can be reliably introduced into the inner liquid chamber R2*b* of the hydraulic accumulator A.

Figure 2:
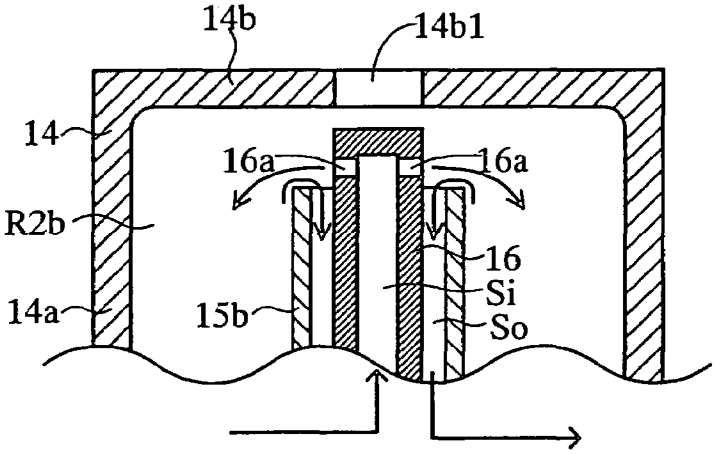
FIG. 2 is a fragmentary, enlarged cross-sectional view showing a modification of the hydraulic accumulator shown in FIG. 1.

In the present embodiment, as shown in FIG. 1, the hydraulic accumulator A is configured in such a manner that the inner-liquid-chamber-R2*b*-side end of the outflow passageway So is open upward. Alternatively, as shown in FIG. 2, the inner-liquid-chamber-R2*b*-side end of the inflow passageway Si may be open sideward via a plurality of small holes 16*a*. In this case, because an operating liquid can be supplied in the manner of a fountain from the inflow passageway Si to the inner liquid chamber R2*b*, air remaining in the upper portion of the inner liquid chamber R2*b* can be bubbled efficiently.

Figure 3:
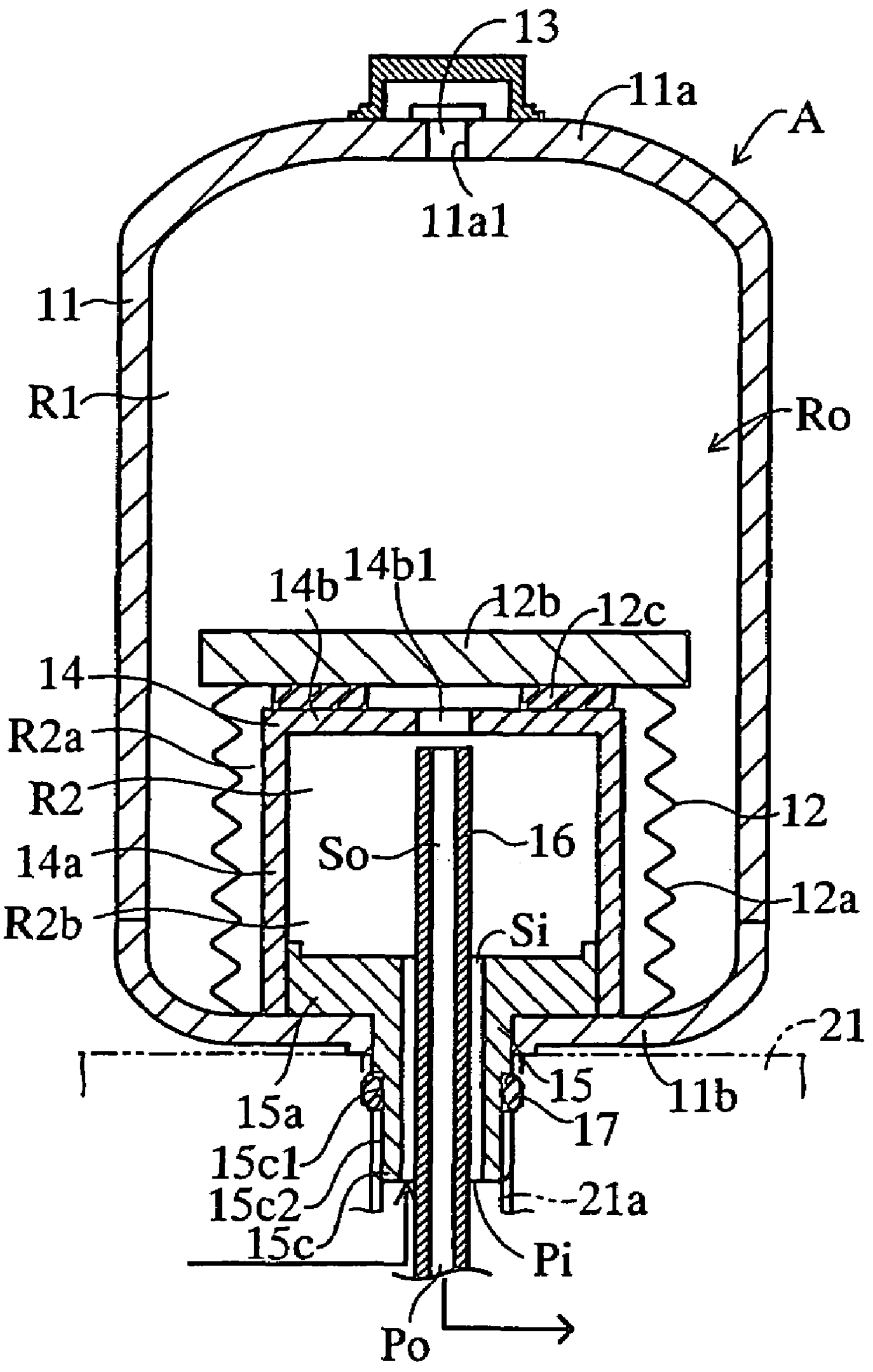
FIG. 3 is a cross-sectional view showing a second embodiment of the hydraulic accumulator according to the present invention.

Further, in the present embodiment, as shown in FIG. 1, the hydraulic accumulator A is configured in such a manner that the inner-liquid-chamber-R2*b*-side end of the inflow passageway Si is open to the upper portion of the inner liquid chamber R2*b*. Alternatively, as shown in FIG. 3, the inner-liquid-chamber-R2*b*-side end of the inflow passageway Si may be open to a lower portion of the inner liquid chamber R2*b*. In the this case, only during the air bleeding operation in which an operating liquid is progressively supplied to the liquid inflow port Pi of the hydraulic accumulator A, the same operation as in the above-described embodiment can be achieved, thus realizing intended excellent air removal. In the embodiment shown in FIG. 3, the liquid inflow port Pi and the inflow passageway Si are formed in the tubular member 15, and the liquid outflow port Po and the outflow passageway So are formed in the pipe (tubular member) 16. The configuration of a remaining portion of FIG. 3 is substantially identical with that of the above-described embodiment shown in FIG. 1.

In the above-described embodiments, the present invention is applied to the hydraulic accumulator A which is equipped with the bellows unit 12, the stay 14, the tubular member 15, the pipe 16, etc.; which has the liquid chamber R2 communicating with the liquid inflow port Pi and the liquid outflow port Po and having a predetermined volume even when no pressurized operating liquid is accumulated; in which the liquid inflow port Pi and the outflow port Po are disposed below the liquid chamber R2; and in which an attachment portion (e.g., the attachment male thread 15*c*2) is provided for attachment to the pump body 21, which serves as a support member. However, with or without modification, the present invention can be applied to other types of hydraulic accumulators which include, in place of the bellows unit 12, a movable wall member, such as a piston or a diaphragm, for dividing the pressure space Ro of the shell 11 into the gas chamber R1 and the liquid chamber R2; which have a liquid chamber having a predetermined volume even when no pressurized operating liquid is accumulated and communicating with the liquid inflow port and the liquid outflow port; and in which the liquid outflow port is disposed below the liquid chamber.

In the above-described embodiments, the inflow passageway Si connecting the inner liquid chamber R2*b* and the liquid inflow port Pi is coaxially disposed within the outflow passageway So connecting the inner liquid chamber R2*b* and liquid outflow port Po. Alternatively, the inflow passageway Si and the outflow passageway So are disposed in parallel (substantially in parallel). In this case as well, the same operation and effects as those in each of the above-described embodiments can be achieved.

In the above-described embodiments, the hydraulic accumulator A is configured in such a manner that the liquid-chamber-side end of the inflow passageway Si opens to the upper portion of the inner liquid chamber R2*b*. Alternatively, the liquid-chamber-side open end of the outflow passageway (So) connecting the liquid chamber and the liquid outflow port may be disposed above the liquid-chamber-side open end of the inflow passageway (Si) connecting the liquid chamber and the liquid inflow port (for example, the amount of projection of the pipe 16 of FIG. 3 into the inner liquid chamber R2*b* may be approximately halved). In this case as well, by the air bleeding operation in which an operating liquid is progressively supplied to the liquid inflow port of the hydraulic accumulator, air within the liquid chamber can be discharged from the liquid chamber, and therefore, intended excellent air removal can be achieved.

Moreover, in the embodiment shown in FIG. 1, the outflow passageway So connecting the inner liquid chamber R2*b* and the liquid outflow port Po is formed by the tubular member 15, which is a single component which also functions as a connection metal piece for connection to the pump body 21, which serves as a support member. However, as in the case of an embodiment shown in FIG. 4, a member corresponding to the tubular member 15 of FIG. 1 may be constituted by two members; i.e., a sleeve 15A and an outflow pipe 15B, which have shapes that facilitate machining. The sleeve 15A also function as a connection metal piece for connection to the pump body 21, and is removably attached to the female thread 21*a* of the pump body 21 by means of the attachment male threaded 15*c*2 formed on the outer circumference of the lower end of the sleeve 15A. The outflow pipe 15B is fitted into the sleeve 15A in a vertically movable condition, and has a radially outwardly extending annular flange portion 15B1 at its lower end. The lower end of the outflow pipe 15B serves as the liquid outflow port Po, and the liquid outflow port Po communicates with a discharge port 21*c* formed in the pump body 21, via an attachment hole 21*b* formed in the pump body 21. Notably, the structure of the remaining portion of FIG. 4 is substantially identical with that of the above-described embodiment shown in FIG. 1.

In this case, the outflow passageway So is formed by the outflow pipe 15B, and the annular flange portion 15B1 of the outflow pipe 15B is biased upward by means of a compression coil spring 18, which is elastic member and is accommodated within the attachment hole 21*b* formed in the pump body 21, whereby the annular flange portion 15B1 is brought into contact with and fixed to the lower end of the sleeve 15A. Therefore, in this case, the outflow passageway So can be formed by the outflow pipe 15B, which is simple and inexpensive, and thus cost of the hydraulic accumulator A can be reduced.

Further, in this case, the outflow pipe 15B is fitted into the sleeve 15A in a vertically movable condition, and the outflow pipe 15B is brought into contact with and fixed to the lower end of the sleeve 15A by means of the biasing force of the compression coil spring 18. Therefore, as compared with a case in which the outflow pipe 15B is fixedly press-fitted into the sleeve 15A, generation of foreign matter because of scratching or the like can be prevented, whereby entry of foreign matter into a hydraulic circuit containing the hydraulic accumulator A can be prevented. Therefore, precise operations of movable sections within a hydraulic circuit containing the hydraulic accumulator A can be guaranteed, and reliability can be improved.

Figure 4:
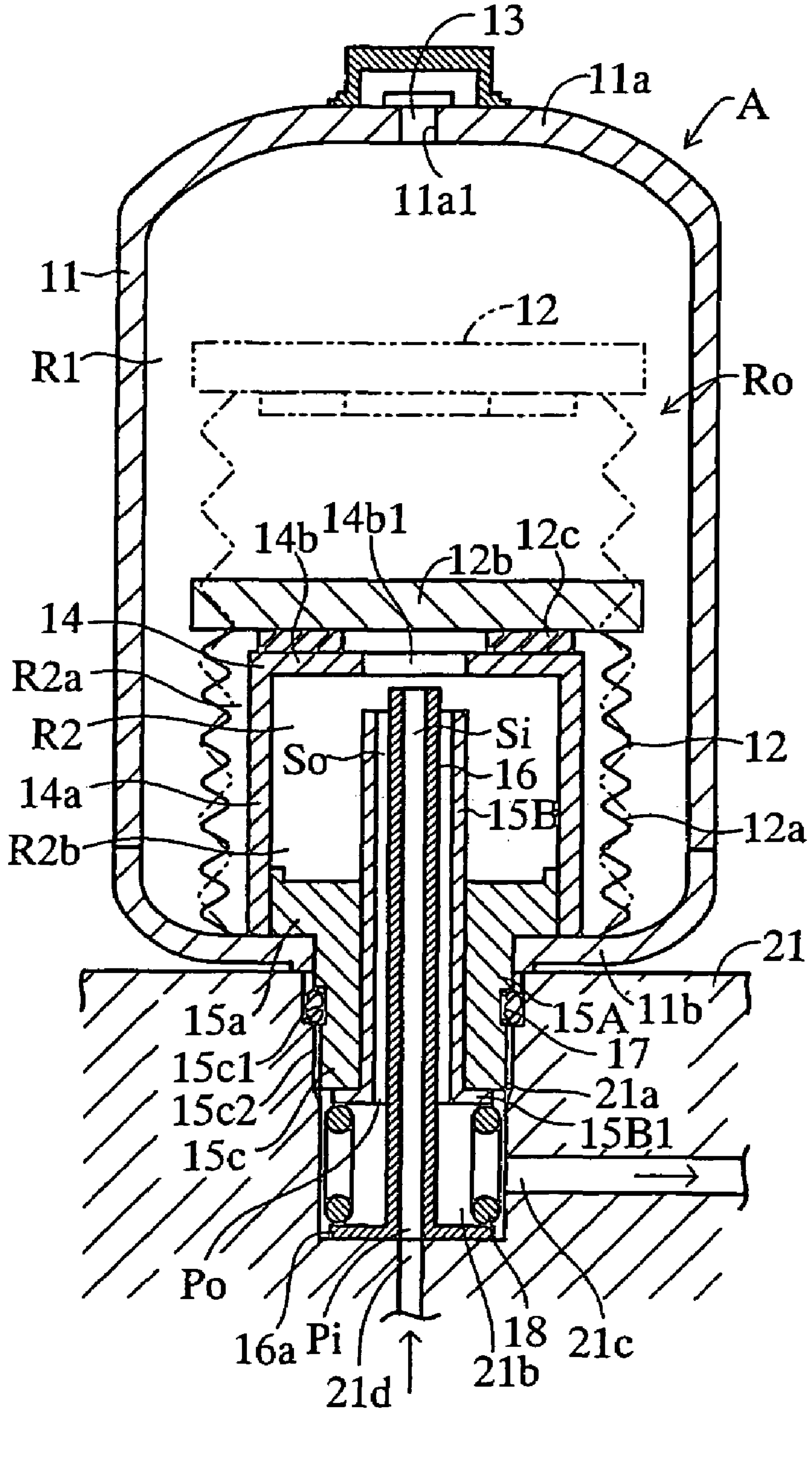
FIG. 4 is a cross-sectional view showing a third embodiment of the hydraulic accumulator according to the present invention.

Moreover, in the embodiment shown in FIG. 4, the inflow pipe 16 connecting the inner liquid chamber R2*b* and the liquid inflow port Pi has a radially outwardly extending annular flange portion 16*a* at its lower end, and is coaxially disposed within the outflow passageway So. An upper end portion of the inflow pipe 16 is projected upward from the outflow pipe 15B, whereby the inflow pipe 16 opens to an upper portion of the inner liquid chamber R2*b*. The annular flange portion 16*a* is biased downward by the compression coil spring 18, whereby the annular flange portion 16*a* is brought into contact with and fixed to a reception portion of the pump body 21; i.e., the bottom of the attachment hole 21*b*. Thus, the lower end of the inflow pipe 16; i.e., the liquid inflow port Pi, communicates directly with a supply port 21*d* formed in the pump body 21.

Therefore, when components such as the inflow pipe 16 and the pump body 21 are of low machining accuracy, during assembly of the hydraulic accumulator A to the pump body 21, the inflow pipe 16 coaxially moves within the outflow passageway So so as to absorb dimensional errors, to thereby enable reliable assembly of the inflow pipe 16. Accordingly, in this case, required accuracies of respective parts can be lowered.

Further, in this case, a work for inspecting the hydraulic accumulator A; i.e., charging into the liquid chamber R2*b* a liquid different from the operating liquid, and checking the charge pressure, the liquid accumulation quantity, etc., to be performed before assembly of the hydraulic accumulator A to the pump body 21, can be performed with the outflow pipe 15B and the inflow pipe 16 removed. Therefore, liquid charged for the purpose of inspection can be reliably drained and removed after completion of the inspection.

In the embodiment shown in FIG. 4, the hydraulic accumulator A is configured in such a manner that all the upward biasing force of the compression coil spring 18 acts on the annular flange portion 15B1 of the outflow pipe 15B. However, a structure as employed in a modified embodiment shown in FIG. 5 may be employed. That is, the annular flange portion 15B1 of the outflow pipe 15B is accommodated within a stepped portion 15A1 formed at the lower end of the sleeve 15A, such that the upward biasing force of the compression coil spring 18 acts in a distributed manner on the annular flange portion 15B1 of the outflow pipe 15B and the lower end of the sleeve 15A. In this case, the biasing force of the compression coil spring 18 acting on the annular flange portion 15B1 of the outflow pipe 15B can be reduced so as to suppress creep of the annular flange portion 15B1 caused by the compression coil spring 18, which creep occurs when the outflow pipe 15B is formed of resin.

Figure 5:
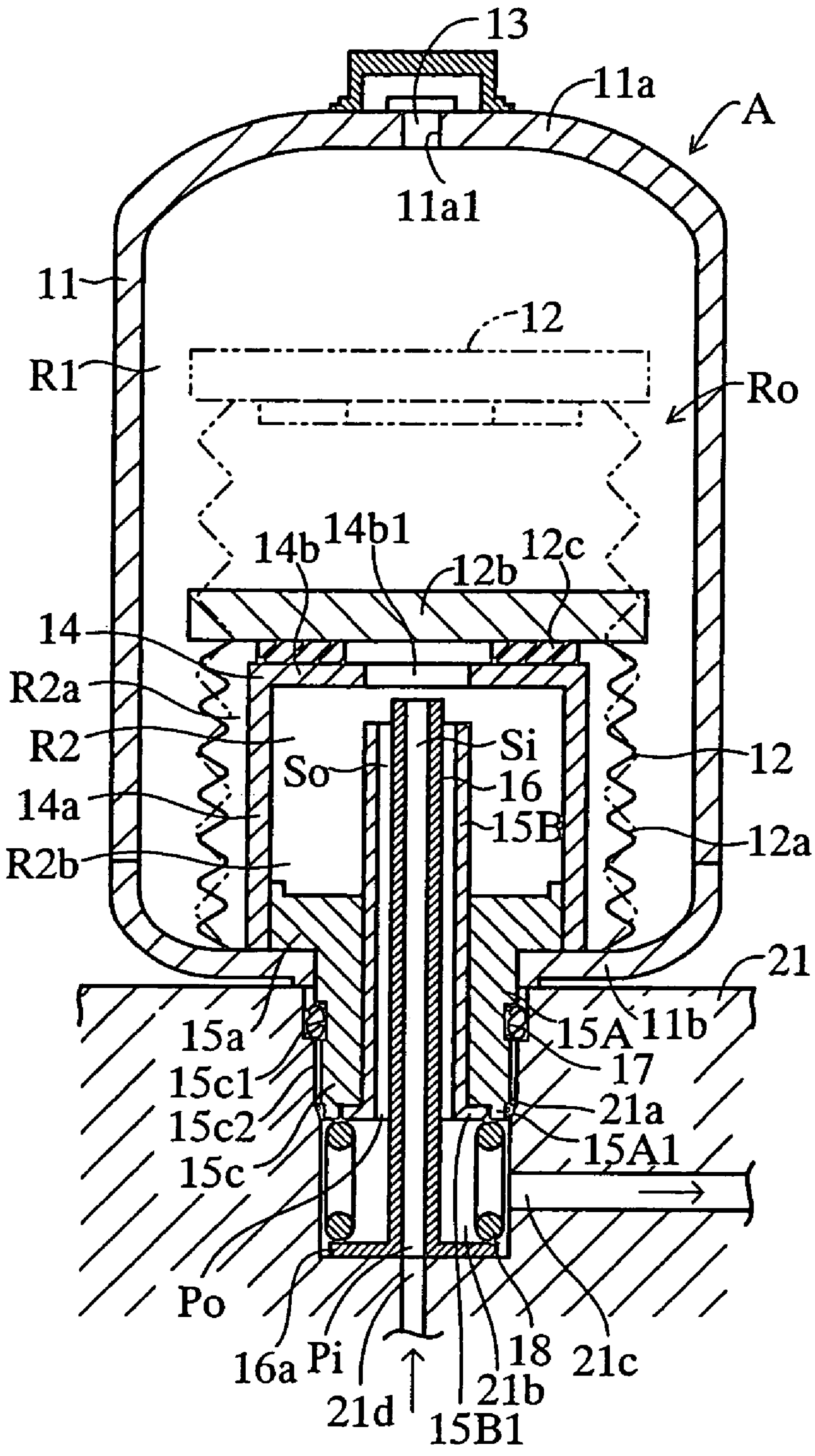
FIG. 5 is a cross-sectional view showing a modification of the hydraulic accumulator shown in FIG. 4.

Moreover, in the embodiments shown in FIGS. 4 and 5, the biasing force of the single compression coil spring 18 acts on both the annular flange portion 15B1 of the outflow pipe 15B and the annular flange portion 16*a* of the inflow pipe 16. However, two elastic members may be provided in such a manner that their biasing forces act on the annular flange portion 15B1 of the outflow pipe 15B and the annular flange portion 16*a* of the inflow pipe 16, respectively. Furthermore, in place of the compression coil spring 18, a cone disc spring, a plate spring, or a rubber member may be used as an elastic member that generates biasing force; and there may be employed a structure such that the elastic member partially biases the annular flange portion.

It is understood that the present invention should by no means be limited to the illustrated example, and various other modifications may be possible without departing from the gist and scope of the invention.

What is claimed is:

1. A hydraulic accumulator including a liquid chamber which is formed in the hydraulic accumulator and has a predetermined volume even when no pressurized operating liquid is accumulated, the liquid chamber communicating with a liquid inflow port and a liquid outflow port, and the liquid ouflflow port being disposed below the liquid chamber, characterized in that a liquid-chamber-side end of an inflow passageway connecting the liquid chamber and the liquid inflow port opens to an upper portion of the liquid chamber, and a liquid-chamber-side end of an outflow passageway connecting the liquid chamber and the liquid outflow port opens to an upper portion of the liquid chamber, wherein the outflow passageway opens to the liquid chamber only at the liquid-chamber-side end thereof.

2. A hydraulic accumulator according to claim 1, wherein the outflow passageway is formed of a tubular member.

3. A hydraulic accumulator according to claim 2, wherein an inflow passageway connecting the liquid chamber and the liquid inflow port is coaxially disposed within the outflow passageway; and a liquid-chamber-side end of the inflow passageway opens to the upper portion of the liquid chamber.

4. A hydraulic accumulator including a liquid chamber which is formed in the hydraulic accumulator and has a predetermined volume even when no pressurized operating liquid is accumulated, the liquid chamber communicating with a liquid inflow port and a liquid outflow port, and the liquid outflow port being disposed below the liquid chamber, characterized in that a liquid-chamber-side open end of an outflow passageway connecting the liquid chamber and the liquid outflow port is located above a liquid-chamber-side open end of an inflow passageway connecting the liquid chamber and the liquid inflow port, wherein the liquid-chamber-side open end of the outflow passageway opens to an upper portion of the liquid chamber.

5. A hydraulic accumulator including a liquid chamber which is formed in the hydraulic accumulator and has a predetermined volume even when no pressurized operating liquid is accumulated, the liquid chamber communicating with a liquid inflow port and a liquid outflow port, and the liquid outflow port being disposed below the liquid chamber, wherein a lower end portion of the hydraulic accumulator is removably attached to a support member having a supply port to be connected to the liquid inflow port and a discharge port to be connected to the liquid outflow port, characterized in that a liquid-chamber-side end of an inflow passageway connecting the liquid chamber and the liquid inflow port opens to an upper portion of the liquid chamber, and a liquid-chamber-side end of an outflow passageway connecting the liquid chamber and the liquid outflow port opens to an upper portion of the liquid chamber.

6. A hydraulic accumulator according to claim 5, wherein the outflow passageway is formed by an outflow pipe having a radially outwardly extending annular flange portion at a lower end, the outflow pipe being vertically movably fitted into a sleeve removably assembled to the support member via an outer circumference of a lower end portion thereof; and the annular flange portion of the outflow pipe is biased upward by means of an elastic member such that the annular flange portion is brought into contact with and fixed to an lower end of the sleeve.

7. A hydraulic accumulator according to claim 5, wherein an inflow pipe is coaxially disposed within the outflow passageway so as to establish communication between the liquid chamber and the liquid inflow port, the inflow pipe having a radially outwardly extending annular flange portion at a lower end; an upper end portion of the inflow pipe opens to the upper portion of the liquid chamber; and the annular flange portion of the inflow pipe is biased downward by means of an elastic member such that the annular flange portion is brought into contact with and fixed to a reception portion of the support member.

8. A hydraulic accumulator according to claim 6, wherein an inflow pipe is coaxially disposed within the outflow passageway so as to establish communication between the liquid chamber and the liquid inflow port, the inflow pipe having a radially outwardly extending annular flange portion at a lower end; an upper end portion of the inflow pipe opens to the upper portion of the liquid chamber; and the annular flange portion of the inflow pipe is biased downward by means of an elastic member such that the annular flange portion is brought into contact with and fixed to a reception portion of the support member.

* * * * *